(12) United States Patent
Yamazawa

(10) Patent No.: US 8,867,947 B2
(45) Date of Patent: Oct. 21, 2014

(54) POWER SUPPLY CONTROL DEVICE INCLUDING SWITCHING REGULATOR AND LINEAR REGULATOR, IMAGE FORMING APPARATUS INCLUDING THE SAME, AND ELECTRONIC APPARATUS INCLUDING THE SAME

(71) Applicant: Mariko Yamazawa, Osaka (JP)

(72) Inventor: Mariko Yamazawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 90 days.

(21) Appl. No.: 13/746,172

(22) Filed: Jan. 21, 2013

(65) Prior Publication Data

US 2013/0195496 A1 Aug. 1, 2013

(30) Foreign Application Priority Data

Jan. 31, 2012 (JP) ................. 2012-018877

(51) Int. Cl.
- G03G 15/00 (2006.01)
- G05F 1/00 (2006.01)
- G05F 1/46 (2006.01)
- H02M 1/00 (2006.01)

(52) U.S. Cl.
CPC G05F 1/46 (2013.01); G03G 15/80 (2013.01); H02M 2001/0045 (2013.01); G03G 15/5004 (2013.01)

USPC ............................................ 399/88; 323/268

(58) Field of Classification Search
CPC ............................................. H02M 2001/0045
USPC ............... 399/88; 363/65; 323/268, 225, 299, 323/303; 307/43, 58

See application file for complete search history.

(56) References Cited

U.S. PATENT DOCUMENTS 7,098,636 B2 * 8/2006 Koerner et al. ............... 323/268
7,872,527 B2 * 1/2011 Smith ........................... 330/127
2009/0261796 A1 * 10/2009 Ito et al. ........................ 323/285

FOREIGN PATENT DOCUMENTS

JP 2004-118408 4/2004

* cited by examiner

*Primary Examiner* — Christ Mahoney
(74) *Attorney, Agent, or Firm* — McDonnell Boehnen Hulbert & Berghoff LLP

(57) ABSTRACT

A power supply control device includes a switching regulator, a linear regulator, a switching unit, a consumed current detection unit, a current determination unit, and a power determination unit. The consumed current detection unit detects a consumed current of the regulator serving as a power supply to the load. The current determination unit determines whether or not the consumed current is greater than or equal to a predetermined current. The power determination unit determines whether or not a consumed power of the regulator is greater than or equal to a predetermined power. The switching unit connects the linear regulator to the load when the consumed current is lower than the predetermined current and the consumed power is lower than the predetermined power.

20 Claims, 5 Drawing Sheets

FIG.3

| P<br>I | L<br>Iout × (Vin−Vout)<Pb | H<br>Iout × (Vin−Vout)≧Pb |
|---|---|---|
| L<br>Iout<Ib | Qout=L<br>LDO regulator | Qout=H<br>DC-DC converter |
| H<br>Iout≧Ib | Qout=H<br>DC-DC converter | Qout=H<br>DC-DC converter |

POWER SUPPLY CONTROL DEVICE INCLUDING SWITCHING REGULATOR AND LINEAR REGULATOR, IMAGE FORMING APPARATUS INCLUDING THE SAME, AND ELECTRONIC APPARATUS INCLUDING THE SAME

INCORPORATION BY REFERENCE

This application is based upon, and claims the benefit of priority from, corresponding Japanese Patent Application No. 2012-018877 filed in the Japan Patent Office on Jan. 31, 2012, the entire contents of which are incorporated herein by reference.

BACKGROUND

Unless otherwise indicated herein, the description in this section is not prior art to the claims in this application and is not admitted to be prior art by inclusion in this section.

The present disclosure relates to a power supply control device including a switching regulator and a linear regulator. The present disclosure also relates to an image forming apparatus and an electronic apparatus including a power supply control device. In particular, the present disclosure relates to a technique for switching between a switching regulator and a linear regulator to serve as a power supply from which power is supplied to loads.

To supply stable power using a power supply control device, a related technique has been proposed in which a switching regulator and a linear regulator are provided. Further, switching between the switching regulator and the linear regulator may provide alternate power supplies. As such, power is supplied to a load in accordance with the output currents of the switching regulator and the linear regulator.

In general, switching regulators reduce a voltage using the switching of, for example, field effect transistors (FETs), whereas linear regulators reduce a voltage using heat generation. Hence, it is known that switching regulators in general have a higher conversion efficiency than linear regulators. However, when the intensity of an output current (consumed current) from a regulator is low, for example, one to ten milliamperes, although the heat loss of a linear regulator is low, the switching loss of a switching regulator is considerably large. Hence, the switching regulator has a lower power conversion efficiency than a linear regulator. As a result, in the related technique, switching from the linear regulator to the switching regulator is performed. As such, power is supplied from a linear regulator to a load when an output current from the regulator is lower than a threshold. Further, power is supplied from a switching regulator to the load when the output current of the regulator is greater than or equal to the threshold, whereby the power conversion efficiencies of the regulators are maintained at high levels.

Printers or multifunction apparatuses have a sleeping time that is much longer than a time for processing jobs. Hence, a reduction in power consumption during a sleeping time is important to reduce the power consumption of printers or multifunction apparatuses. During a sleeping time, processing that consumes a large amount of power, such as image processing, is not performed. As such, power consumption of a control substrate, i.e., current consumption, is small. Hence, it is effective to employ a technique of maintaining high power conversion efficiency even when a consumed current is small as in the power supply control device shown in the related technique described above.

However, considering the power supply control device of the related technique described above, there may be cases in which the power consumption of the linear regulator increases and the temperature of the linear regulator increases to a predetermined temperature. Further, there may be a state where power is supplied to a load from the linear regulator when the output current is below the threshold. In one or more of the cases above, a thermal shut down function operates to protect the linear regulator, whereby the operation of the linear regulator is stopped. When the protection function operates in this manner, although the linear regulator is protected from high temperatures, reactivation of the power supply control device may be required since the regulator has stopped operating.

SUMMARY

A power supply control device according to an embodiment of the present disclosure includes a switching regulator, a linear regulator, a switching unit, a consumed current detection unit, a current determination unit, and a power determination unit. The switching unit may be configured to switch between the switching regulator and the linear regulator so that either the switching regulator or the linear regulator serves as a power supply to a load. The consumed current detection unit may be configured to detect a consumed current based at least on either the switching regulator or the linear regulator serving as the power supply to the load. The current determination unit may be configured to determine whether or not the consumed current detected by the consumed current detection unit is greater than or equal to a predetermined current. The power determination unit may be configured to detect a consumed power of either the switching regulator or the linear regulator serving as the power supply to the load and determine whether or not the detected consumed power is greater than or equal to a predetermined power, where the predetermined power is lower than a power at which the linear regulator is expected to perform thermal protection. The switching unit makes the linear regulator serve as the power supply to the load only when a first determination result shows the consumed current is lower than the predetermined current and a second determination result shows the consumed power is lower than the predetermined power.

An image forming apparatus according to an embodiment of the present disclosure includes the power supply control device and an image forming mechanism configured to perform various operations necessary for image forming and serving as the load that receives power from the power supply control device.

An electronic apparatus according to an embodiment of the present disclosure includes a load and the power supply control device.

These as well as other aspects, advantages, and alternatives will become apparent to those of ordinary skill in the art by reading the following detailed description with references to the accompanying drawings (where appropriate). Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a diagram illustrating, using a table, the relationship between the input values and the output values of an OR circuit, according to an embodiment of the present disclosure;

DETAILED DESCRIPTION

Figure 1:
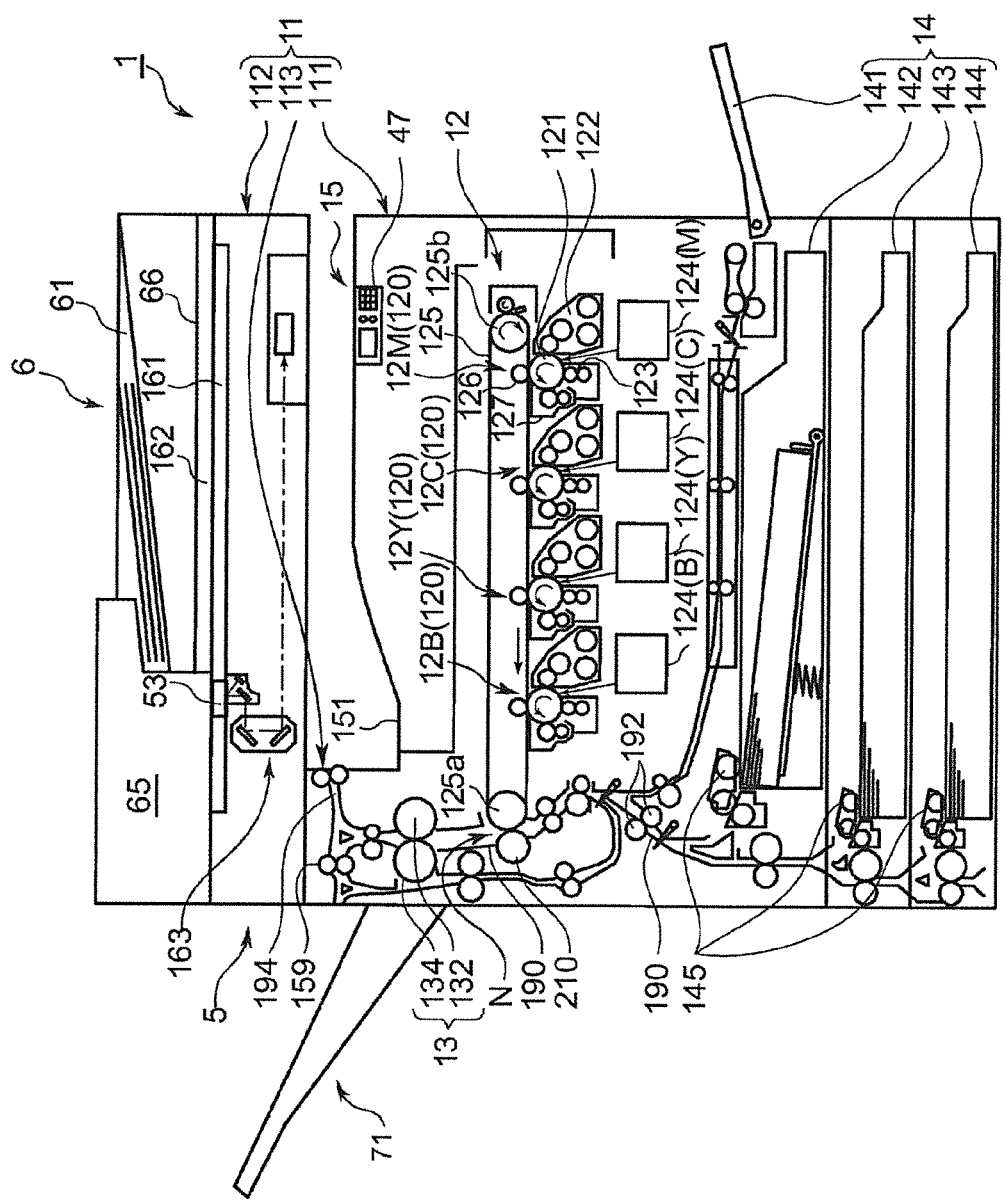
FIG. 1 is a front cross-sectional view of the structure of an image forming apparatus including a power supply control device, according to an embodiment of the present disclosure.

An example apparatus is described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, a power supply control device and an image forming apparatus according to an embodiment of the present disclosure will be described with reference to the drawings. As noted, FIG. 1 is a front cross-sectional view of the structure of an image forming apparatus including a power supply control device, according to an embodiment of the present disclosure. An image forming apparatus 1 is multifunction apparatus having a plurality of functions, such as a copy function, a printer function, a scanner function, and a facsimile function. The image forming apparatus 1 includes a power supply control device, according to an embodiment of the present disclosure. In other words, the image forming apparatus 1 is configured to include, in an apparatus main body 11, an image forming unit 12, a fixing unit 13, a paper feed unit 14, a paper ejection unit 15, an original-document conveying unit 6, an image reading unit 5, and the power supply control unit. The power supply control unit supplies power to the image forming unit 12, the fixing unit 13, the paper feed unit 14, the paper ejection unit 15, the original-document conveying unit 6, the image reading unit 5, a control unit described later (FIG. 2), and the like.

The apparatus main body 11 includes a lower main body 111, an upper main body 112 arranged above so as to face the lower main body 111, and a connection portion 113 arranged between the upper main body 112 and the lower main body 111. The image reading unit 5 and the original-document conveying unit 6 are provided on the upper main body 112.

The image reading unit 5 includes a contact glass 161 on which an original document is placed (provided on an upper opening of the upper main body 112), an openable and closable original-document holding cover 162 that holds in place an original document placed on the contact glass 161, and a reading mechanism 163 that reads the image of an original document placed on the contact glass 161. The reading mechanism 163 optically reads the image of an original document using image sensors, such as charge coupled devices (CCDs) and complementary metal oxide semiconductor (CMOS) devices, and generates image data. The reading mechanism 163 is driven by power supplied by regulators described further below.

The original-document conveying unit 6, driven by a feed roller and a conveying roller, feeds and conveys the original document placed on an original-document placement unit 61. The original-document conveying unit feeds each document on a page by page basis to a position facing an original-document reading slit 53, thereby allowing the original document to be read by the reading mechanism 163 of the image reading unit 5 through the original-document reading slit 53. The original-document conveying unit 6 then ejects the original document to an original-document ejection unit 66. It should be noted that in the case of a specific setting, an original document may be conveyed by the original-document conveying unit 6 and read by the reading mechanism 163 positioned under the original-document reading slit 53. As such, the reading mechanism 163 may read the original document conveyed by the original-document conveying unit 6 through the original-document reading slit 53.

The lower main body 111 houses the image forming unit 12, the fixing unit 13, and the paper feed unit 14. The paper feed unit 14 includes paper feed cassettes 142, 143, and 144 that are insertable into and removable from the apparatus main body 11.

The image forming unit 12 performs an image forming operation for forming a toner image on recording paper that is fed from the paper feed unit 14. The image forming unit 12 includes a magenta image forming unit 12M that uses a magenta color toner, a cyan image forming unit 12C that uses a cyan color toner, a yellow image forming unit 12Y using a yellow color toner, and a black image forming unit 12B using a black color toner (hereinafter, called "image forming units 120" when these units are not distinguished from one another). The image forming units 120 are arranged sequentially from the upstream side to the downstream side in the running direction of an intermediate transfer belt 125. The intermediate transfer belt 125 is wound around between a plurality of rollers, such as a driving roller 125a (e.g., a secondary transfer opposing roller) and a secondary transfer roller 20. In some instances, a driving roller 125a may place the intermediate transfer belt 125 in a tensioned state in such a manner to provide perpetual rotation in a sub-scanning direction during image forming. In some instances, a secondary transfer roller 210 may be in contact with the outer surface of the intermediate transfer belt 125 at a portion where the intermediate transfer belt 125 is laid on the driving roller 125a in a tensioned state.

Each of the image forming units 120 integrally includes a photosensitive drum 121, a developing device 122 that supplies toner to the photosensitive drum 121, a cartridge (not illustrated) that contains toner, a charging device 123, an exposure device 124, a primary transfer roller 126, and a drum cleaning device 127.

The photosensitive drum 121 forms, on the surface thereof, an electrostatic latent image and a toner image corresponding to the electrostatic latent image. The developing device 122 supplies toner to the photosensitive drum 121. From the toner cartridge, toner is appropriately supplied to the developing device 122.

The charging devices 123 are arranged directly under the photosensitive drums 121. The charging devices 123 make the surfaces of the photosensitive drums 121 become uniformly charged.

The exposure devices 124 are arranged below the charging devices 123 which are below the photosensitive drums 121. The exposure devices 124 irradiate the surfaces of the charged photosensitive drums 121 with laser beams corresponding to the respective colors based on image data input. For example, image data may be obtained by an image reading unit 5 and may thereby form electrostatic latent images on the surfaces of the photosensitive drums 121. The exposure devices 124 are laser exposure devices, each including a laser source that outputs a laser beam, and a polygonal mirror that reflects the laser beam onto the surface of the photosensitive drum 121. The exposure device 124 may also include optical components, such as lenses and mirrors for guiding the laser beam reflected by the polygonal mirror to the photosensitive drum 121.

Each of the developing devices 122 provides toner to the electrostatic latent image on the surface of the photosensitive drum 121. The photosensitive drum 121 rotates in the direction of the arrow (illustrated in FIG. 1) and deposits the toner, thereby forming a toner image on the surface of the photosensitive drum 121 corresponding to the image data.

The intermediate transfer belt 125 is arranged above the photosensitive drums 121. The intermediate transfer belt 125 is laid across the left side of the driving roller 125a and the right side of the driving roller 125b in FIG. 1 in a tensioned state so as to provide the perpetual rotation. The outer surface of the intermediate transfer belt 125 facing downward is in contact with the surfaces of the photosensitive drums 121. The driven roller 125b is provided at a position opposing the driving roller 125a, and is driven to rotate in accordance with the perpetual rotation of the intermediate transfer belt 125. An image holding surface to which a toner image is transferred is set on the outer surface of the intermediate transfer belt 125, which is driven by the driving roller 125a while maintaining contact with the surface of the photosensitive drum 121. The intermediate transfer belt 125 perpetually rotates between the driving roller 125a and the driven roller 125b in synchronization with the photosensitive drum 121.

The primary transfer rollers 126 are provided at positions facing the photosensitive drums 121 with the intermediate transfer belt 125 therebetween. A transfer bias is applied to each of the primary transfer rollers 126 by a transfer bias application mechanism (not illustrated). Further, each of the primary transfer rollers 126 cause the toner image formed on the outer surface of the corresponding photosensitive drum 121 to be transferred to the surface of the intermediate transfer belt 125.

Figure 2:
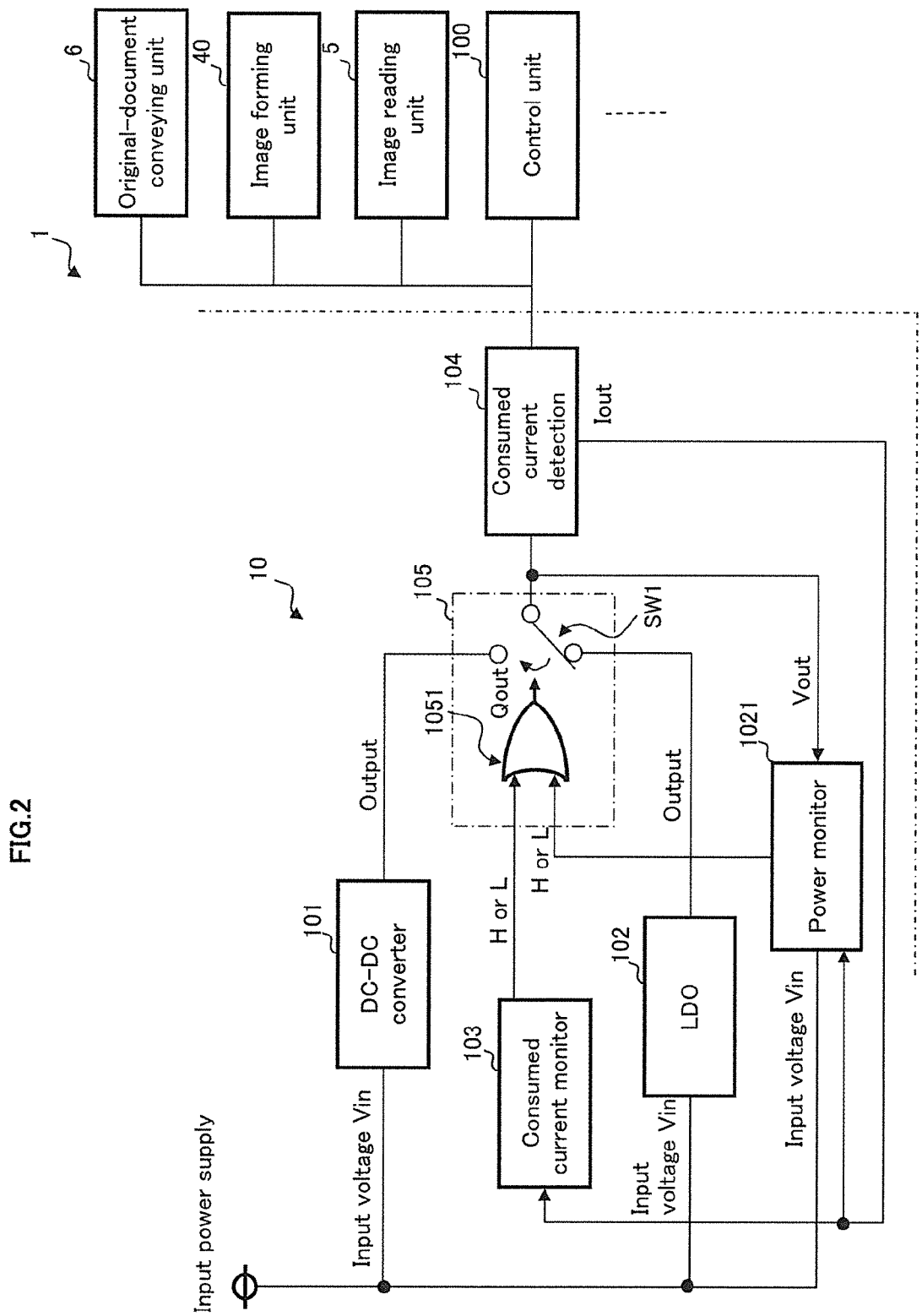
FIG. 2 is a block diagram of the power supply control device, according to a first embodiment of the present disclosure.

FIG. 2 is a block diagram of the power supply control device, according to an embodiment of the present disclosure. A control unit 100 controls the driving of the primary transfer rollers 126 and the image forming units 120 in FIG. 1. Referring back to FIG. 1, the control unit 100 causes a magenta toner image to be formed by the magenta image forming unit 12M and transfers the image to the surface of the intermediate transfer belt 125. Further, the control unit 100 causes a cyan toner image to be formed by the cyan image forming unit 12C and transfers the image to the surface of the intermediate transfer belt 125 at the same position as the magenta toner image. Yet further, the control unit 100 causes a yellow toner image to be formed by the yellow image forming unit 12Y and transfers the image to the intermediate transfer belt 125 at the same position as the magenta toner image. In addition, the control unit 100 causes a black toner image to be formed by the black image forming unit 12B and transfers the image to the intermediate transfer belt 125 at the same position as the magenta toner image. These images may be transferred in such a manner that these toner images are superimposed with one another, thereby forming a color toner image on the surface of the intermediate transfer belt 125 (intermediate transfer (primary transfer)).

A transfer bias is applied to the secondary transfer roller 210 by a transfer bias mechanism (not illustrated). The secondary transfer roller 210 causes the color toner image formed on the surface of the intermediate transfer belt 125 to be transferred to recording paper conveyed from the paper feed unit 14. The secondary transfer roller 210 forms a nip portion (designated "N" in FIG. 1), at which the toner image is secondarily transferred to the recording paper placed between the driving roller 125a and the intermediate transfer belt 125. The recording paper conveyed along a paper conveying path 190 is sandwiched with pressure created between the intermediate transfer belt 125 and the secondary transfer roller 210 at the nip portion N, where the toner image on the intermediate transfer belt 125 is secondarily transferred to the recording paper.

The drum cleaning devices 127, which are provided to the left of the photosensitive drums 121 in FIG. 1, clean the photosensitive drums 121 by removing residual toner from the surfaces of the photosensitive drums 121.

The paper conveying path 190 extending in the vertical direction is formed at a position left of the image forming unit 12 in FIG. 1. Roller pairs 192 are provided in appropriate places along the paper conveying path 190. The roller pairs 192 convey recording paper fed from the paper feed unit 14 toward the nip portion N and the fixing unit 13. In other words, recording paper is conveyed by a conveying mechanism positioned appropriately with roller pairs 192.

The fixing unit 13 includes a heating roller 132 housing an electric heating element as a heating source and a pressing roller 134 arranged in such a manner as to face the heating roller 132. The fixing unit 13 performs fixing processing on the toner image transferred onto recording paper in the image forming unit 12 by applying heat from the heating roller 132 while the recording paper passes through the nip portion N between the heating roller 132 and the pressing roller 134. The recording paper, on which a color image has been formed after fixing processing, passes through a paper ejection path 194 that extends from the upper portion of the fixing unit 13 and is ejected toward an ejection tray 151 provided at the top of the lower main body 111.

The paper feed unit 14 includes a manual feed tray 141 provided on the right wall of the apparatus main body 11 in FIG. 1. The paper feed unit 14 may be configured such that it may be opened or closed to access paper feed cassettes 142, 143, and 144. Pickup rollers 145 are provided above the paper feed cassettes 142, 143, and 144, respectively. The pickup rollers 145 feed the respective top sheets of recording paper among the sheets of recording paper stacked in the paper feed cassettes 142, 143, and 144 toward the paper conveying path 190.

The paper ejection unit 15 is positioned between the lower main body 111 and the upper main body 112. The paper ejection unit 15 includes the ejection tray 151 positioned on the top surface of the lower main body 111. The ejection tray 151 is a tray to which recording paper on which a toner image has been formed by the image forming unit 12 is ejected after having been subjected to fixing processing performed by the fixing unit 13.

A power supply control device according to a first embodiment will now be described. As noted, FIG. 2 is a block diagram of the power supply control device, according to an embodiment of the present disclosure.

A power supply control device 10 includes a DC-DC converter 101, a low drop-out regulator (LDO) 102, a consumed current monitor 103, a consumed current detection unit 104, a switching unit 105, and a power monitor 1021.

The DC-DC converter (an example of a switching regulator) 101 converts a DC current of a certain voltage into a DC current of a different voltage. The DC-DC converter 101 is a power supply regulating circuit with which an output voltage/current is controlled so as to be always maintained constant using a voltage drop based on switching of field effect transistors (FETs) and the like. The DC-DC converter 101, for example, converts a DC voltage of 24 V supplied from a 24 V power supply circuit as an input power supply into a DC voltage of 10 V as an output. It should be noted that the voltage output by the DC-DC converter 101 through conversion is not limited to 10 V and may be appropriately changed.

The low drop-out regulator (an example of a linear regulator) 102 is a regulated power supply circuit that outputs regulated power after reducing an input voltage (causing a voltage drop). Further, the low drop-out regulator 102 operates even when the input voltage slightly exceeds a desired output voltage. For example, the low drop-out regulator 102 converts a DC voltage of 24 V supplied from a 24 V power supply as an input power supply into a DC voltage of 10 V as an output. The low drop-out regulator 102 stops the driving operation due to a thermal shut down function when the temperature increases to a predetermined high temperature at which thermal protection is triggered to be performed. It should be noted that the voltage output by the low drop-out regulator 102 for conversion is not limited to 10 V and may be appropriately changed.

The DC-DC converter 101 and the low drop-out regulator 102 supply output voltages to the image reading unit 5, the image forming unit 40, the original-document conveying unit 6, the control unit 100, and the like provided in the image forming apparatus 1.

It should be noted that the low drop-out regulator 102 reduces a voltage using the thermal shut down function, whereas the DC-DC converter 101 reduces a voltage using switching of, for example, FETs as described above. Hence, the DC-DC converter 101 generally has an advantage over the low drop-out regulator 102 in terms of power conversion efficiency. However, consider the case where the output currents of the DC-DC converter 101 and the low drop-out regulator 102 are low currents of, for example, one to ten milliamperes. In such instances, switching loss in the DC-DC converter 101 becomes considerable, whereas heat loss in the low drop-out regulator 102 may decrease, particularly when the difference between the input and output voltages is small. Hence, under such conditions, the low drop-out regulator 102 has a better power conversion efficiency than the DC-DC converter 101.

The consumed current detection unit 104 detects a consumed current (designated "Iout" in FIG. 2) that indicates the consumed current of the low drop-out regulator 102 or the DC-DC converter 101. As such the consumed current detection unit 104 outputs the detected consumed current Iout to the consumed current monitor 103 and the power monitor 1021. The consumed current detection unit 104 may operate as an ammeter, for example.

The consumed current monitor (current determination unit) 103 compares the consumed current Iout transmitted from the consumed current detection unit 104 with a predetermined current Ib (not shown in FIG. 2), and determines whether or not the consumed current Iout is greater than or equal to the current Ib. The consumed current monitor 103 outputs a high (designated "H" in FIG. 2) signal to the switching unit 105 when it is determined that the consumed current Iout is greater than or equal to the current Ib, and outputs a low (designated "L" in FIG. 2) signal to the switching unit 105 when it is determined that the consumed current Iout is lower than the current Ib. The predetermined current Ib is a current at which the power conversion efficiency of the DC-DC converter 101 exceeds that of the low drop-out regulator 102 and is set in the consumed current monitor 103 in advance by a manufacturer. For example, as described above, when the output current from the low drop-out regulator 102 is a low current of one to ten milliamperes, the heat loss of the low drop-out regulator 102 is small and the switching loss of the DC-DC converter 101 is considerable. Hence, the predetermined current Ib may be a predetermined current that is higher than the low current described above.

The power monitor (power determination unit) 1021 includes a consumed power detection unit for detecting the consumed power of the low drop-out regulator 102 and the consumed power of the DC-DC converter 101. It is assumed that the consumed power is consumed power "P." The power monitor 1021 calculates the consumed power P of the low drop-out regulator 102 or the DC-DC converter 101 by multiplying the consumed current Iout transmitted from the consumed current detection unit 104 with the difference between an input voltage (designated "Vin" in FIG. 2) from an input power supply and the output voltage (designated "Vout" in FIG. 2) of the low drop-out regulator 102 or the DC-DC converter 101. Further, the power monitor 1021 determines whether or not the consumed power P calculated as described above is greater than or equal to a predetermined power Pb. The predetermined power Pb is lower than a power at which the low drop-out regulator 102 is expected to have such a temperature as to require thermal protection. The power monitor 1021 outputs a high (H) signal to the switching unit 105 when it is determined that the consumed power P is greater than or equal to the predetermined power Pb, and outputs a low (L) signal to the switching unit 105 when it is determined that the consumed power P is lower than the predetermined power Pb.

The switching unit 105 is a mechanism that switches between the DC-DC converter 101 and the low drop-out regulator 102 so that either the DC-DC converter 101 or the low drop-out regulator 102 is made to serve as a power supply to a load. The switching unit 105 includes an OR circuit 1051 and a switch SW1.

The H signal or the L signal is input to the OR circuit 1051 from the consumed current monitor 103 and the power monitor 1021. The OR circuit 1051 outputs the logical sum of the input (the H signal or the L signal) from the consumed current monitor 103 and the input (the H signal or the L signal) from the power monitor 1021 to the switch SW1 as a switching instruction signal.

Switching between the DC-DC converter 101 and the low drop-out regulator 102 is performed by the switch SW1 so that either the DC-DC converter 101 or the low drop-out regulator 102 serves as a power supply to loads including the image forming unit 40, the original-document conveying unit 6, the image reading unit 5, and the control unit 100. Switching between the DC-DC converter 101 and the low drop-out regulator 102 is performed by the switch SW1 so that either the DC-DC converter 101 or the low drop-out regulator 102 serves as a power supply in accordance with the instruction of the switching instruction signal output from the OR circuit 1051.

It should be noted that the control unit 100 controls the driving of the whole image forming apparatus 1, an image forming operation, an original-document conveying operation, an image reading operation, and the like. The control unit 100 also performs, for example, image processing on read images (processing for enhancing the quality of read images and the like, such as smoothing, edge enhancement, hue adjustment, and shading compensation). The image forming unit 40 illustrated in FIG. 2 includes the image forming unit 12 illustrated in FIG. 1. Further, the image forming unit 40 may also include the fixing unit 13, the paper feed unit 14, and the paper ejection unit 15 illustrated in FIG. 1. The image forming unit 40, the original-document conveying unit 6, the image reading unit 5, and the control unit 100 are examples of an image forming mechanism.

Power supply control performed by the power supply control unit will now be described with reference to FIG. 2 described above and FIG. 3. FIG. 3 illustrates the relationship between the input values and the output values of the OR circuit 1051 using a table.

In the power supply control device 10, at the initial operation time, for example, the switch SW1 is in a state where either the DC-DC converter 101 or the low drop-out regulator 102 is connected to a load. The state of connection performed by the switch SW1 at the initial operation time is controlled by a switching instruction signal output from the control unit 100 to the switch SW1.

As described above, in a state where either the DC-DC converter 101 or the low drop-out regulator 102 is connected to a load, the consumed current detection unit 104 detects the output current Iout of the DC-DC converter 101 or the low drop-out regulator 102. Further, the output current detection unit 104 detects the consumed current of the DC-DC converter 101 or the low drop-out regulator 102. The consumed current detection unit 104 outputs the detected output current (consumed current) Iout to the consumed current monitor 103 and the power monitor 1021.

The consumed current monitor 103 determines whether or not the consumed current Iout transmitted from the consumed current detection unit 104 is greater than or equal to the predetermined current Ib. The consumed current monitor 103 outputs a high (H) signal to the switching unit 105 when it is determined that the consumed current Iout is greater than or equal to the current Ib, and outputs a low (L) signal to the switching unit 105 when it is determined that the consumed current Iout is lower than the current Ib.

On the other hand, the power monitor 1021 calculates the consumed power P of the low drop-out regulator 102 or the DC-DC converter 101 by multiplying the consumed current Iout by the difference between an input voltage (Vin) and the output voltage (Vout) of the low drop-out regulator 102 or the DC-DC converter 101. The power monitor 1021 determines whether or not the consumed power P calculated as described above is greater than or equal to the predetermined power Pb and outputs a high (H) signal to the switching unit 105 when it is determined that the consumed power P is greater than or equal to the predetermined power Pb. Further, the power monitor 1021 outputs a low (L) signal to the switching unit 105 when it is determined that the consumed power P is lower than the predetermined power Pb.

The OR circuit 1051 outputs the logical sum of the H signal or L signal input from the consumed current monitor 103 and the H signal or L signal input from the power monitor 1021. As such, the OR circuit 1051 operates to switch SW1 as a switching instruction signal. Referring to FIG. 3, the OR circuit 1051 outputs an L signal as a switching instruction signal (Qout) to the switch SW1 only when L signals are input from both the consumed current monitor 103 and the power monitor 1021. The switch SW1, when an L signal is input, is switched to the low drop-out regulator 102 side (as shown in FIG. 2).

Referring to FIG. 3, the OR circuit 1051 outputs an H signal to the switch SW1 as the switching instruction signal Qout when an H signal is input from either the consumed current monitor 103 or the power monitor 1021. Then, the switch SW1, when the input signal is an H signal, is switched to the DC-DC converter 101 side.

The switch SW1 is switched from being connected to the DC-DC converter 101 to the low drop-out regulator 102 in accordance with the instruction of the switching instruction signal Qout from the OR circuit 1051.

In other words, only when the consumed current Iout of a regulator used as a power supply is lower than the predetermined current Ib and the consumed power P of the regulator is lower than the predetermined power Pb, the switching unit 105 connects the low drop-out regulator 102 to a load. As such, power is supplied from the low drop-out regulator 102 to the load.

When the consumed current Iout of a regulator used as a power supply is greater than or equal to the predetermined current Ib or when the consumed power P of the regulator is greater than or equal to the predetermined power Pb, the switching unit 105 connects the DC-DC converter 101 to a load, whereby power is supplied to the load from the DC-DC converter 101. It should be noted that the switching unit 105 may connect the DC-DC converter 101 to the load, irrespective of the consumed current Iout.

According to the power supply control device 10, during a period in which power is supplied from the low drop-out regulator 102 to a load, switching is performed such that power is supplied to the load from the DC-DC converter 101 rather than from the low drop-out regulator 102. Further, power is supplied from DC-DC converter 101 not only when the consumed current Iout of the low drop-out regulator 102 is greater than or equal to the predetermined current Ib, but also when the consumed power P of the low drop-out regulator 102 is greater than or equal to the power Pb. As noted above, the power Pb is lower than a power at which thermal protection of the linear regulator is expected to be performed. Hence, according to the power supply control device 10, even when the consumed power of the low drop-out regulator 102 increases, the low drop-out regulator 102 is prevented from entering a state in which thermal protection is expected to be performed. This makes it possible to prevent the low drop-out regulator 102 from entering this state where thermal protection is performed and the low drop-out regulator 102 stops operating due to a thermal shut down function. Thus, such preventative measures eliminate any needs for reactivating the power supply control device 10 caused by the operation being stopped. As a result, the power supply control device 10 provides for efficiency by allowing for switching power between the DC-DC converter 101 and the low drop-out regulator 102. Further, various embodiments of switching may be controlled in such a manner to maintain operation at a high level of efficiency and to allow further power saving without compromising user-friendliness.

Figure 4:
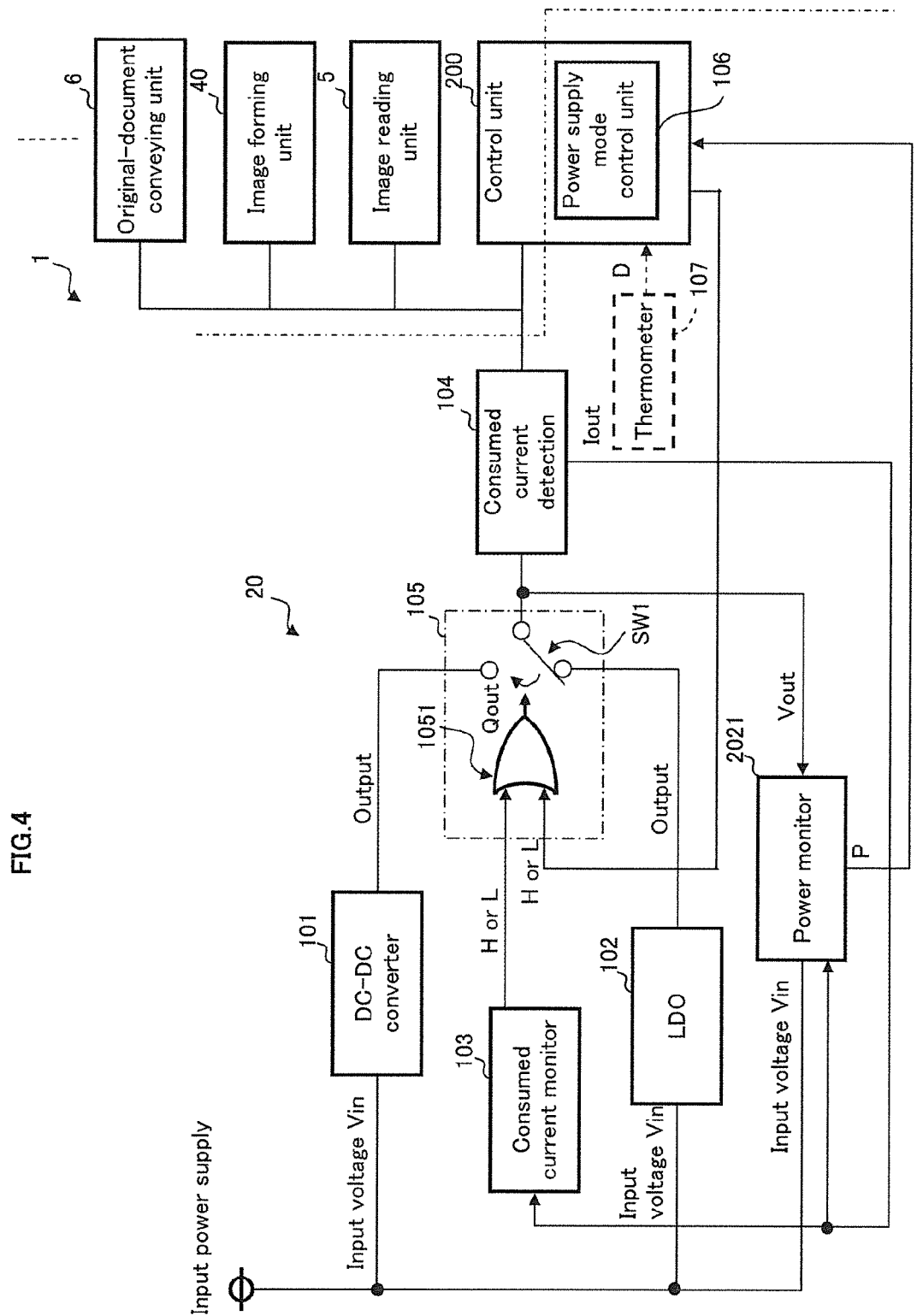
FIG. 4 is a block diagram of a power supply control device, according to a second embodiment of the present disclosure.

Next, a power supply control device according to a second embodiment will be described. FIG. 4 is a block diagram of the power supply control device. It should be noted that in the configuration of the second embodiment, components which are the same as those of the first embodiment are denoted by the same reference symbols and the descriptions thereof may be omitted.

Unlike the power supply control device 10 according to the first embodiment, the power supply control device 20, according to the second embodiment, includes a power supply mode control unit 106 provided in a control unit 200.

A power monitor 2021, which detects the consumed power P of the low drop-out regulator 102 and the DC-DC converter 101, transmits the detected consumed power P to the power supply mode control unit 106.

The power supply mode control unit 106 obtains the consumed power P output from the power monitor 2021, and determines whether or not the consumed power P is greater than or equal to a predetermined power Pb. The power supply mode control unit 106 outputs an H signal to the OR circuit 1051 of the switching unit 105 when it is determined that the consumed power P is greater than or equal to the power Pb, and outputs an L signal to the OR circuit 1051 when it is determined that the consumed power P is lower than the power Pb. In other words, in the second embodiment, the power monitor 2021 does not determine whether or not the consumed power P is greater than or equal to the power Pb.

The OR circuit 1051 of the switching unit 105 receives the H signal or L signal input from the consumed current monitor 103 and the power supply mode control unit 106. Further, the OR circuit 1051 outputs the logical sum of the H signal or L signal input from the consumed current monitor 103 and the H signal or L signal input from the power supply mode control unit 106 to the switch SW1 as the switching instruction signal Qout described above. In this case, the switching instruction signal Qout (output signal) that is output from the OR circuit 1051 for input signals is similar to that illustrated in FIG. 3.

In the power supply control device 20 according to the second embodiment, since the power supply mode control unit 106 of the control unit 200 obtains the consumed power P from the power monitor 2021, the control unit 200 can use the determination results obtained by the power supply mode control unit 106 for other control purposes.

For example, as illustrated in FIG. 4, a dotted line is used to illustrate a thermometer 107. As such, when the power supply control device 20 further includes the thermometer 107 for detecting the temperature of the low drop-out regulator 102, the control unit 200 obtains a detected temperature D from the thermometer 107, and further control is possible.

Figure 5:
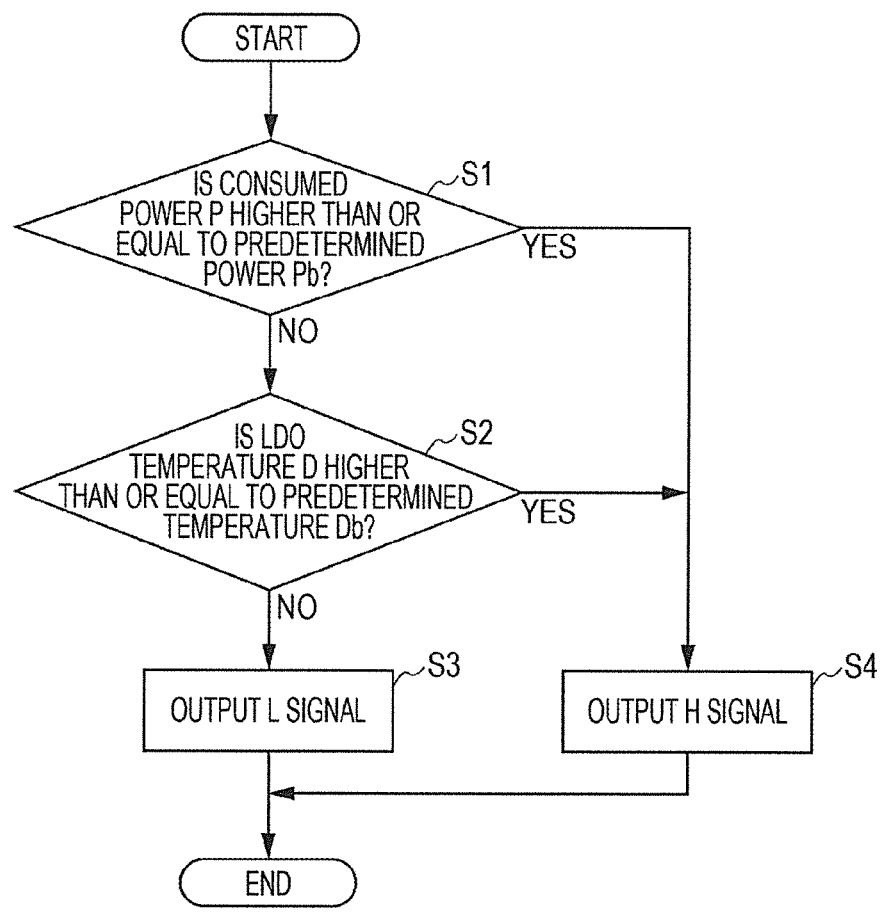
FIG. 5 is a flowchart illustrating the determination performed by a power supply mode control unit in accordance with the temperature of a low drop-out regulator, according to the second embodiment of the present disclosure.

FIG. 5 is a flowchart illustrating the determination performed by the power supply mode control unit 106 in accordance with the temperature of the low drop-out regulator 102.

The power supply mode control unit 106 outputs an H signal to the OR circuit 1051 of the switching unit 105 when it is determined that the consumed power P transmitted from the power monitor 2021 is greater than or equal to the power Pb (Yes in step S1).

On the other hand, when it is determined that the consumed power P is lower than the power Pb (No in step S1), the power supply mode control unit 106 further determines whether or not the detected temperature D output from the thermometer 107 is greater than or equal to a predetermined temperature Db (step S2). The predetermined temperature Db is a predetermined temperature that is lower than a temperature at which thermal protection is expected to be performed for the low drop-out regulator 102.

Here, when it is determined by the power supply mode control unit 106 that the detected temperature D output from the thermometer 107 is greater than or equal to the predetermined temperature Db (Yes in step S2), the power supply mode control unit 106 outputs an H signal to the OR circuit 1051 (step S4). In other words, the power supply mode control unit 106 outputs an H signal to the OR circuit 1051 when the detected temperature D output from the thermometer 107 is greater than or equal to the predetermined temperature Db. It should be noted that the power supply mode control unit 106 outputs an H signal irrespective of whether the consumed power P is not greater than or equal to the power Pb.

On the other hand, when it is determined by the power supply mode control unit 106 that the detected temperature D output from the thermometer 107 is less than the predetermined temperature Db (No in step S2), the power supply mode control unit 106 outputs an L signal to the OR circuit 1051 (step S3). In other words, the power supply mode control unit 106 outputs an L signal to the OR circuit 1051 only when the consumed power P is lower than the power Pb and the detected temperature D output from the thermometer 107 is lower than the predetermined temperature Db.

As a result, the switching unit 105 can switch the connection such that power is supplied from the DC-DC converter 101 before the low drop-out regulator 102 is shut down by a thermal protection function (e.g., when the temperature of the low drop-out regulator 102 approaches a temperature at which thermal protection for the low drop-out regulator 102 is expected to be performed, even when the consumed power P of the low drop-out regulator 102 is lower than the power Pb).

It should be noted that the present disclosure is not limited to the configurations of the embodiments described above, and various modifications are possible. For example, in the embodiments described above, the low drop-out regulator 102 is only an example of a linear regulator and a linear regulator is not limited to the low drop-out regulator 102. For example, three-terminal regulators may also be used. Further, the DC-DC converter 101 is just an example of a switching regulator, and a switching regulator is not limited to the DC-DC converter 101. For example, a chopper-type regulator may be used.

Although the power monitor 1021 is provided outside of the low drop-out regulator 102 and the DC-DC converter 101 in the embodiments described above, the power monitor 1021 may be (1) provided within the low drop-out regulator 102 or (2) provided within the DC-DC converter 101.

With above configuration (1), since the results of determination performed by the power determination unit is directly input from the linear regulator to the switching unit, the configuration of the power supply control device may be simplified.

Although the configurations of an image forming apparatus have been described in the embodiments described above, the present disclosure is not limited to this, and may be applied to electronic apparatuses, such as personal computers.

The configurations and processing illustrated in the embodiments described above using FIGS. 1 to 5 are just embodiments of the present disclosure, and the configurations and processing of the present disclosure are not limited to these.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein, will be apparent to those skilled in the art from the foregoing descriptions. Such modifications and variations are intended to fall within the scope of the appended claims. With respect to any or all of the flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the flow charts discussed herein, and these flow charts may be combined with one another, in part or in whole.

The invention claimed is:

1. A power supply control device comprising:
   a switching regulator;
   a linear regulator;
   a switching unit configured to switch between the switching regulator and the linear regulator so that either the switching regulator or the linear regulator serves as a power supply to a load;
   a consumed current detection unit configured to detect a consumed current based at least on either the switching regulator or the linear regulator serving as the power supply to the load;
   a current determination unit configured to determine whether or not the consumed current detected by the consumed current detection unit is greater than or equal to a predetermined current; and
   a power determination unit configured to detect a consumed power of either the switching regulator or the linear regulator serving as the power supply to the load and determine whether or not the consumed power is greater than or equal to a predetermined power,
   wherein the predetermined power is lower than a power at which the linear regulator is expected to perform thermal protection, and
   wherein the switching unit makes the linear regulator serve as the power supply to the load only when a first determination result shows that the consumed current is lower than the predetermined current and a second determination result shows that the consumed power is lower than the predetermined power.

2. The power supply control device according to claim 1, wherein the power determination unit is provided in the linear regulator.

3. The power supply control device according to claim 1, wherein the power determination unit is provided in the switching regulator.

4. The power supply control device according to claim 1, wherein based at least on the first determination result and the second determination result, either the switching regulator or the linear regulator serves as the power supply to at least one of an original-document conveying unit, an image forming unit, an image reading unit, and a control unit.

5. The power supply control device according to claim 1,
   wherein the power determination unit includes a consumed power detection unit that detects the consumed power of the regulator serving as the power supply, and
   wherein the power determination unit further includes a determination unit that determines whether or not the consumed power detected by the consumed power detection unit is greater than or equal to the predetermined power and outputs the second determination result to the switching unit, and
   wherein a driving control unit configured to control an electronic apparatus that receives power from the switching regulator and the linear regulator functions as the determination unit.

6. The power supply control device according to claim 5, further comprising:
   a temperature detection unit that detects a temperature of the linear regulator,
   wherein the determination unit determines whether or not the detected temperature input from the temperature detection unit is greater than or equal to a predetermined temperature, and
   wherein the predetermined temperature is lower than a temperature at which the linear regulator is expected to perform thermal protection, and
   wherein when it is determined by the determination unit that the detected temperature is greater than or equal to the predetermined temperature, the determination unit outputs a third determination result showing that the consumed power detected by the consumed power detection unit is greater than or equal to the predetermined power to the switching unit irrespective of whether or not the consumed power detected by the power detection unit is greater than or equal to the predetermined power.

7. The power supply control unit according to claim 6, wherein when it is determined by the determination unit that the detected temperature is less than the predetermined temperature, the switching unit makes the linear regulator serve as the power supply to the load based at least on the second determination result showing that the consumed power is lower than the predetermined power.

8. An image forming apparatus comprising:
   a power supply control device including:
      a switching regulator;
      a linear regulator;
      a switching unit configured to switch between the switching regulator and the linear regulator so that either the switching regulator or the linear regulator serves as a power supply to a load;
      a consumed current detection unit configured to detect a consumed current based at least on either the switching regulator or the linear regulator serving as the power supply to the load;
      a current determination unit configured to determine whether or not the consumed current detected by the consumed current detection unit is greater than or equal to a predetermined current; and
      a power determination unit configured to detect a consumed power of either the switching regulator or the linear regulator serving as the power supply to the load and determine whether or not the consumed power is greater than or equal to a predetermined power, wherein the predetermined power is lower than a power at which the linear regulator is expected to perform thermal protection, and
      wherein the switching unit makes the linear regulator serve as the power supply to the load only when a first determination result shows that the consumed current is lower than the predetermined current and a second determination result shows that the consumed power is lower than the predetermined power; and
   an image forming mechanism configured to perform operations for image forming and serves as the load that is supplied power from the power supply control device.

9. The image forming apparatus according to claim 8, wherein the power determination unit is provided in the linear regulator.

10. The image forming apparatus according to claim 8, wherein the power determination unit is provided in the switching regulator.

11. The image forming apparatus according to claim 8, wherein based at least on the first determination result and the second determination result, either the switching regulator or the linear regulator serves as the power supply to at least one of an original-document conveying unit, an image reading unit, and a control unit.

12. The image forming apparatus according to claim 8, wherein the power determination unit includes a consumed power detection unit that detects the consumed power of the regulator serving as the power supply, and wherein the power determination unit further includes a determination unit that determines whether or not the consumed power detected by the consumed power detection unit is greater than or equal to the predetermined power and outputs the second determination result to the switching unit, and wherein a driving control unit configured to control an electronic apparatus that receives power from the switching regulator and the linear regulator functions as the determination unit.

13. The image forming apparatus according to claim 12, further comprising:

a temperature detection unit that detects a temperature of the linear regulator, wherein the determination unit determines whether or not the detected temperature input from the temperature detection unit is greater than or equal to a predetermined temperature, and wherein the predetermined temperature is lower than a temperature at which the linear regulator is expected to perform thermal protection, and wherein when it is determined by the determination unit that the detected temperature is greater than or equal to the predetermined temperature, the determination unit outputs a third determination result showing that the consumed power detected by the consumed power detection unit is greater than or equal to the predetermined power to the switching unit irrespective of whether or not the consumed power detected by the power detection unit is greater than or equal to the predetermined power.

14. The image forming apparatus according to claim 13, wherein when it is determined by the determination unit that the detected temperature is less than the predetermined temperature, the switching unit makes the linear regulator serve as the power supply to the load based at least on the second determination result showing that the consumed power is lower than the predetermined power.

15. An electronic apparatus comprising:

a load; and a power supply control device including:

a switching regulator;

a linear regulator;

a switching unit configured to switch between the switching regulator and the linear regulator so that either the switching regulator or the linear regulator serves as a power supply to the load;

a consumed current detection unit configured to detect a consumed current based at least on either the switching regulator or the linear regulator serving as the power supply to the load;

a current determination unit configured to determine whether or not the consumed current detected by the consumed current detection unit is greater than or equal to a predetermined current; and a power determination unit configured to detect a consumed power of either the switching regulator or the linear regulator serving as the power supply to the load and determine whether or not the consumed power is greater than or equal to a predetermined power, wherein the predetermined power is lower than a power at which the linear regulator is expected to perform thermal protection, and wherein the switching unit makes the linear regulator serve as the power supply to the load only when a first determination result shows that the consumed current is lower than the predetermined current and a second determination result shows that the consumed power is lower than the predetermined power.

16. The electronic apparatus according to claim 15, wherein the power determination unit is provided in the linear regulator.

17. The electronic apparatus according to claim 15, wherein the power determination unit is provided in the switching regulator.

18. The electronic apparatus according to claim 15, wherein the power determination unit includes a consumed power detection unit that detects the consumed power of the regulator serving as the power supply, and wherein the power determination unit further includes a determination unit that determines whether or not the consumed power detected by the consumed power detection unit is greater than or equal to the predetermined power and outputs the second determination result to the switching unit, and wherein a driving control unit configured to control an electronic apparatus that receives power from the switching regulator and the linear regulator functions as the determination unit.

19. The electronic apparatus according to claim 18, further comprising:

a temperature detection unit that detects a temperature of the linear regulator, wherein the determination unit determines whether or not the detected temperature input from the temperature detection unit is greater than or equal to a predetermined temperature, and wherein the predetermined temperature is lower than a temperature at which the linear regulator is expected to perform thermal protection, and wherein when it is determined by the determination unit that the detected temperature is greater than or equal to the predetermined temperature, the determination unit outputs a third determination result showing that the consumed power detected by the consumed power detection unit is greater than or equal to the predetermined power to the switching unit irrespective of whether or not the consumed power detected by the power detection unit is greater than or equal to the predetermined power.

20. The electronic apparatus according to claim 18, wherein when it is determined by the determination unit that the detected temperature is less than the predetermined temperature, the switching unit makes the linear regulator serve as the power supply to the load based at least on the second determination result showing that the consumed power is lower than the predetermined power.

* * * * *